(12) United States Patent
Byun

(10) Patent No.: US 11,841,805 B2
(45) Date of Patent: *Dec. 12, 2023

(54) MEMORY SYSTEM FOR STORING MAP DATA IN HOST MEMORY AND OPERATING METHOD OF THE SAME

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/877,135

(22) Filed: Jul. 29, 2022

(65) Prior Publication Data

US 2022/0365884 A1 Nov. 17, 2022

Related U.S. Application Data

(63) Continuation of application No. 16/455,961, filed on Jun. 28, 2019, now Pat. No. 11,429,538.

(30) Foreign Application Priority Data

Nov. 21, 2018 (KR) .......................... 10-2018-0144914

(51) Int. Cl.
*G06F 12/123* (2016.01)
*G06F 9/30* (2018.01)
(Continued)

(52) U.S. Cl.
CPC .......... *G06F 12/123* (2013.01); *G06F 3/0619* (2013.01); *G06F 3/0652* (2013.01);
(Continued)

(58) Field of Classification Search
CPC .............. G06F 12/123; G06F 9/30043; G06F 12/1027; G06F 12/0246; G06F 3/0658;
(Continued)

(56) References Cited

U.S. PATENT DOCUMENTS

2012/0124276 A1  5/2012 Ahn et al.
2012/0173832 A1  7/2012 Post et al.
(Continued)

FOREIGN PATENT DOCUMENTS

CN  101558392 A  10/2009
CN  101788954 A   7/2010
(Continued)

OTHER PUBLICATIONS

Li Yongwei, A Study on Buffer Management Algorithms for NANO Flash-based Solid State Drive, May 27, 2017, pp. 1-76, Graduate School of Hunan University, China.

Jesung Kim et al., A Space-Efficient Flash Translation Layer for Compactflash Systems, IEEE Transactions on Consumer Electronics, May 2002, pp. 366-375 vol. 48, No. 2.

*Primary Examiner* — Tasnima Matin
(74) *Attorney, Agent, or Firm* — IP & T GROUP LLP

(57) ABSTRACT

Provided herein may be a memory system and a method of operating the same. The memory system may include a host configured to generate and output a host command and a host address and to receive and store host map data, a controller configured to store map data, generate an internal command in response to the host command, and map the host address to an internal address based on the map data, and a memory device configured to perform an operation in response to the internal command and the internal address, wherein the controller is configured to load, when the map data corresponding to the host address is not stored in the controller, new map data into a map data storage area storing map data that is identical to the host map data.

6 Claims, 11 Drawing Sheets

(51) Int. Cl.
  *G06F 12/1027* (2016.01)
  *G06F 12/02* (2006.01)
  *G06F 3/06* (2006.01)

(52) U.S. Cl.
  CPC .......... *G06F 3/0658* (2013.01); *G06F 3/0659* (2013.01); *G06F 9/30043* (2013.01); *G06F 12/0246* (2013.01); *G06F 12/1027* (2013.01); *G06F 3/0679* (2013.01)

(58) Field of Classification Search
  CPC .... G06F 3/0652; G06F 3/0619; G06F 3/0659; G06F 3/0679; G06F 2212/7203; G06F 2212/7201; G06F 2212/7208; G06F 2212/1032; G06F 3/064; G06F 12/0238; G06F 12/0882; G06F 12/1009
  See application file for complete search history.

(56) References Cited

U.S. PATENT DOCUMENTS

| | | | |
|---|---|---|---|
| 2017/0068621 A1* | 3/2017 | Watanabe | G06F 3/0679 |
| 2017/0185480 A1 | 6/2017 | Choi | |
| 2017/0337204 A1* | 11/2017 | Szilagyi | G06F 16/71 |
| 2018/0285275 A1* | 10/2018 | Barczak | G06F 12/0871 |

FOREIGN PATENT DOCUMENTS

| | | |
|---|---|---|
| CN | 102799392 A | 11/2012 |
| CN | 108073470 A | 5/2018 |
| CN | 111209223 B | 5/2023 |

\* cited by examiner

MEMORY SYSTEM FOR STORING MAP DATA IN HOST MEMORY AND OPERATING METHOD OF THE SAME

CROSS-REFERENCE TO RELATED APPLICATION

The present application is a continuation application of U.S. patent application Ser. No. 16/455,961 filed on Jun. 28, 2019, which claims priority under 35 U.S.C. § 119(a) to Korean patent application number 10-2018-0144914 filed on Nov. 21, 2018, the entire disclosure of which is incorporated herein by reference in its entirety.

BACKGROUND

Field of Invention

Various embodiments of the present disclosure generally relate to an electronic device, and more particularly, to a memory system and a method of operating the memory system.

Description of Related Art

Recently, the paradigm for a computer environment has transitioned to ubiquitous computing so that computer systems can be used anytime and anywhere. Due to this, the use of portable electronic devices such as mobile phones, digital cameras, and notebook computers has rapidly increased. In general, such portable electronic devices use a memory system which employs a memory device, in other words, use a data storage device. The data storage device is used as a main memory device or an auxiliary memory device for portable electronic devices.

A data storage device using a memory device provides advantages in that, since there is no mechanical driving part, stability and durability are excellent, information access speed is very high, and power consumption is low. In the context of a memory system, data storage devices having such advantages include a universal serial bus (USB) memory device, memory cards having various interfaces, and a solid state drive (SSD).

Memory devices are mainly classified as either a volatile memory device or a nonvolatile memory device.

A nonvolatile memory device has comparatively low write and read speeds, but retains stored data even when the supply of power is interrupted. Therefore, a nonvolatile memory device is used to store data which must be retained regardless of whether power is supplied. Representative examples of a nonvolatile memory device include a read-only memory (ROM), a mask ROM (MROM), a programmable ROM (PROM), an erasable programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM). A flash memory may be a NOR type or a NAND type.

SUMMARY

Various embodiments of the present disclosure are directed to a memory system, which can improve the efficiency of a map data load operation in a memory system capable of storing map data in a host memory, and to a method of operating the memory system.

An embodiment of the present disclosure may provide for a memory system. The memory system may include a host configured to generate and output a host command and a host address and to receive and store host map data, a controller configured to store map data, generate an internal command in response to the host command, and map the host address to an internal address based on the map data, and a memory device configured to perform an operation in response to the internal command and the internal address, wherein the controller is configured to load, when the map data corresponding to the host address is not stored in the controller, new map data into a map data storage area storing map data that is identical to the host map data is stored.

An embodiment of the present disclosure may provide for a memory system. The memory system may include a memory device in which a plurality of pieces of map data are stored, a controller configured to read select pieces of map data, among the plurality of pieces of map data, store the read select pieces of map data in a map data storage block including a plurality of map data storage areas, and output some of the select pieces of map data as host map data, during a power-on operation, and a host configured to receive and store the host map data, wherein the controller is configured to load new map data into a map data storage area in which map data identical to the host map data is stored, among the plurality of map data storage areas, during a map data load operation.

An embodiment of the present disclosure may provide for a method operating a memory system. The method may include storing select pieces of map data, among a plurality of pieces of map data stored in a memory device, in a plurality of map data storage areas included in a controller, storing some of the select pieces of map data stored in the plurality of map data storage areas, as host map data, in a host memory, selecting, as a victim area, a map data storage area in which map data identical to the host map data is stored from among the plurality of map data storage areas during a map data load operation, and reading new map data stored in the memory device, and storing the new map data in the map data storage area selected as the victim area.

DETAILED DESCRIPTION

Figure 1:
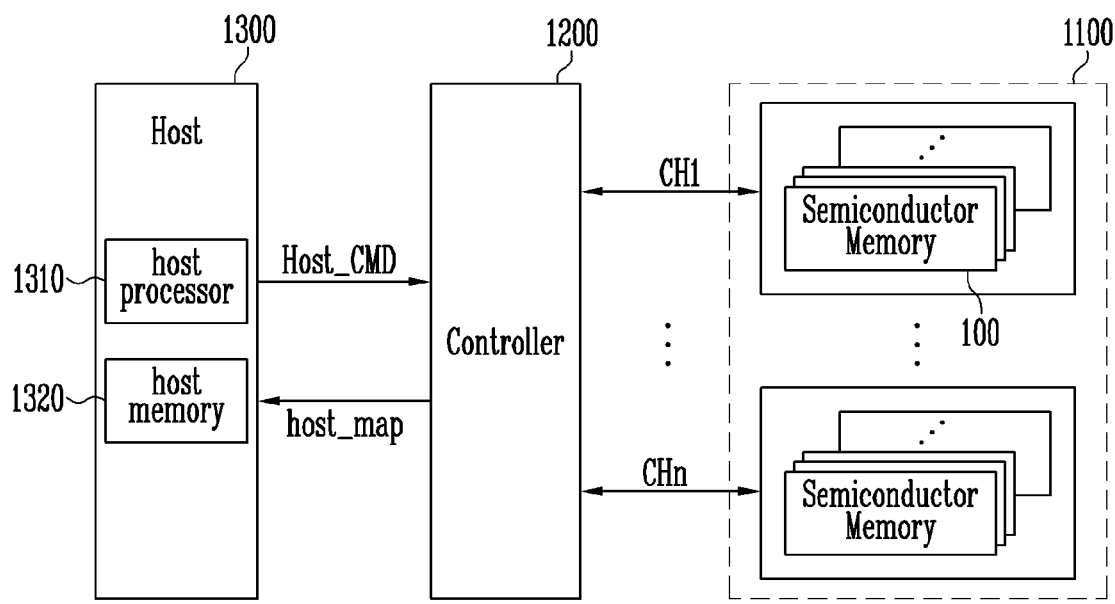
FIG. 1 is a block diagram illustrating a memory system according to an embodiment of the present disclosure.

Specific structural and functional description provided herein is directed to embodiments of the present disclosure. Such description, however, is not intended to limit the scope of the invention to the disclosed embodiments, as the invention may be implemented in various forms, which may be modifications or variations of any of the disclosed embodiments.

Moreover, while the disclosed embodiments are described in detail, the present invention is not limited to specific details. Rather, the present invention covers all modifications, equivalents, alternatives and substitutes that do not depart from the spirit and technical scope of the present disclosure.

It will be understood that, although the terms "first" and/or "second" may be used herein to identify various elements, these elements are not limited by these terms. These terms are only used to distinguish one element from another element that otherwise have the same or similar names. For example, a first element in one instance could be termed a second element in another instance without departing from the teachings of the present disclosure.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or directly adjacent to" should be construed in the same way.

The terminology used herein is for the purpose of describing particular embodiments only and is not intended to be limiting. In the present disclosure, the singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and not be interpreted in an idealized or overly formal sense unless expressly so defined herein.

Detailed description of functions and structures well known to those skilled in the art is omitted to avoid obscuring the subject matter of the present disclosure. This aims to omit unnecessary description so as to make the present disclosure clear.

Embodiments of the present disclosure are described with reference to the accompanying drawings in order to describe the present disclosure in detail so that those having ordinary knowledge in the technical field to which the present disclosure pertains can easily practice the present disclosure. Throughout the specification, reference to "an embodiment," "another embodiment" or the like is not necessarily to only one embodiment, and different references to any such phrase are not necessarily to the same embodiment(s).

FIG. 1 is a block diagram illustrating a memory system 1000 according to an embodiment of the present disclosure.

Referring to FIG. 1, the memory system 1000 may include a memory device 1100, a controller 1200, and a host 1300. The memory device 1100 may include a plurality of semiconductor memories 100. The plurality of semiconductor memories 100 may be divided into a plurality of groups. In an embodiment of the present disclosure, as illustrated in FIG. 1, the host 1300 is included in the memory system 1000. However, in another embodiment, the memory system 1000 may be configured to include only the controller 1200 and the memory device 1100, and the host 1300 may be disposed externally to the memory system 1000.

In FIG. 1, it is illustrated that the plurality of groups of the memory devices 1100 respectively communicate with the controller 1200 through first to n-th channels CH1 to CHn. Each semiconductor memory 100 will be described in detail later with reference to FIG. 4.

Each of the plurality of groups configured using the semiconductor memories 100 may individually communicate with the controller 1200 through a single common channel. The controller 1200 may control the semiconductor memories 100 of the memory device 1100 through the plurality of channels CH1 to CHn.

The controller 1200 is coupled between the host 1300 and the memory device 1100. The controller 1200 may access the memory device 1100 in response to a request from the host 1300. For example, the controller 1200 may control a read operation, a write operation, an erase operation, and a background operation of the memory device 1100 in response to a host command Host_CMD received from the host 1300. The host 1300 may transmit data and an address together with the host command Host_CMD during a write operation, and may transmit an address together with the host command Host_CMD during a read operation.

The controller 1200 may transmit part or all of map data, temporarily stored in the controller 1200, as host map data host_map, to the host 1300. The controller 1200 may provide an interface between the memory device 1100 and the host 1300. The controller 1200 may run firmware for controlling the memory device 1100.

When the host command Host_CMD and the address, corresponding to a read or write operation, are received from the host 1300, the controller 1200 may check whether map data corresponding to the received address is present among pieces of map data stored in the controller 1200. When the corresponding map data is present, an address mapping operation is performed, whereas when the corresponding map data is not present, a map data load operation may be performed by reading the map data corresponding to the address from the memory device 1100.

During the map data load operation, the controller 1200 may select and erase some of a plurality of map data storage spaces (areas) in which pieces of map data are stored depending on a scheme to secure a map data storage area, and may load new map data into the erased map data storage areas. The scheme of selecting some map data storage areas to be erased may include first selecting a map data storage area storing the same map data as that stored in the host 1300, and then selecting a map data storage area storing the oldest map data or the least recently referenced map data, among pieces of map data stored in the plurality of map data storage areas, according to a first-in-first-out (FIFO) or least recently used (LRU) algorithm.

The host 1300 may include a host processor 1310 and a host memory 1320. The host processor 1310 may generate one or more host commands Host_CMD corresponding to user requests, and may transmit the host commands Host_CMD to the controller 1200. The host memory 1320 may store host map data host_map received from the controller 1200.

The host 1300 may include a portable electronic device, such as a computer, a personal digital assistant (PDA), a portable multimedia player (PMP), an MP3 player, a camera, a camcorder, or a mobile phone. The host 1300 may request a write operation, a read operation or an erase operation of the memory system 1000 through the host commands Host_CMD. The host 1300 may transmit a host command Host_CMD corresponding to a write command, data, and an address to the controller 1200 so as to perform a write operation of the memory device 1100, and may transmit a host command Host_CMD corresponding to a read command and an address to the controller 1200 so as to perform a read operation of the memory device 1100. Here, the address may be a logical address.

The controller 1200 and the memory device 1100 may be integrated into a single semiconductor device. In an embodiment, the controller 1200 and the memory device 1100 may be integrated into a single semiconductor device to form a memory card, such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

In another embodiment, the controller 1200 and the memory device 1100 may be integrated into a single semiconductor device to form a solid state drive (SSD). The SSD includes a storage device configured to store data in each semiconductor memory 100.

In an embodiment, the memory system 1000 may be provided as one of various elements of an electronic device such as a computer, an ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a three-dimensional (3D) television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, one of various elements for forming a computing system, or the like.

In an embodiment, the memory device 1100 or the memory system 1000 may be mounted in various types of packages. For example, the memory device 1100 or the memory system 1000 may be packaged and mounted as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), or the like.

Figure 2:
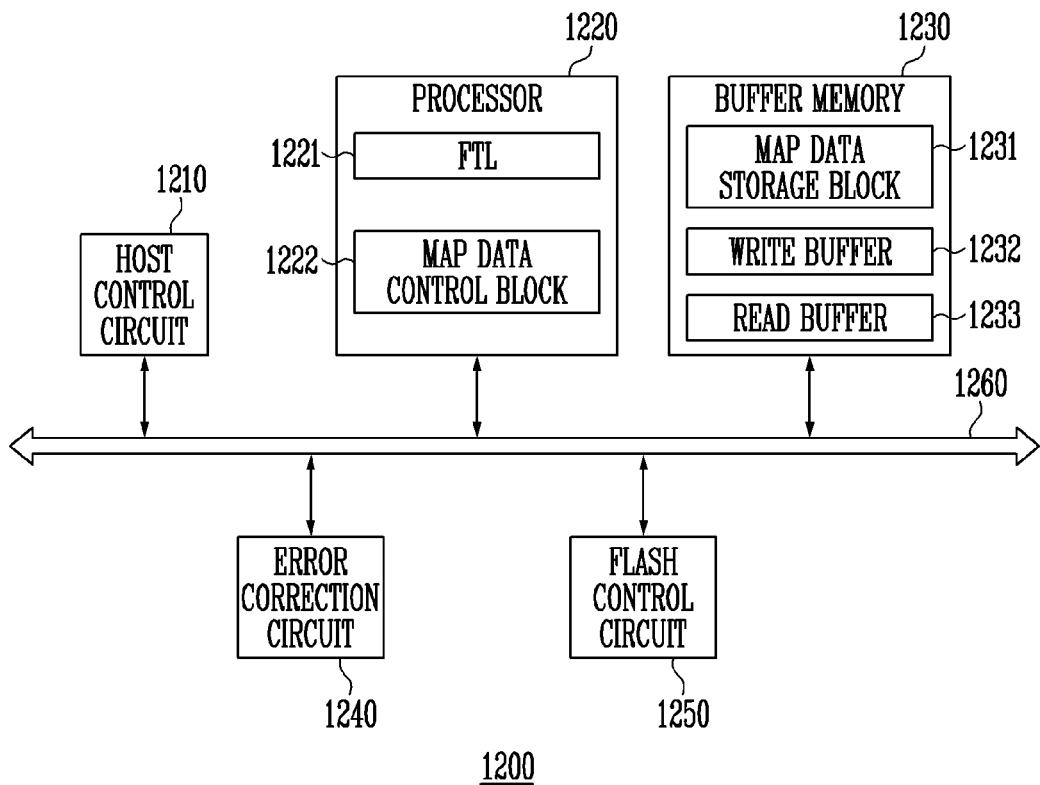
FIG. 2 is a block diagram illustrating a configuration of a controller, such as that of FIG. 1.

FIG. 2 is a diagram illustrating the controller 1200 of FIG. 1.

Referring to FIG. 2, the controller 1200 may include a host control circuit 1210, a processor 1220, a buffer memory 1230, an error correction circuit 1240, a flash control circuit 1250, and a bus 1260.

The bus 1260 may provide a channel between components of the controller 1200.

The host control circuit 1210 may control data transmission between a host 1300 of FIG. 1 and the buffer memory 1230. In an example, the host control circuit 1210 may control an operation of buffering data, input from the host 1300, in the buffer memory 1230. In an example, the host control circuit 1210 may control an operation of outputting the data, buffered in the buffer memory 1230, to the host 1300.

Further, the host control circuit 1210 may transmit some of pieces of map data, stored in the buffer memory 1230, as host map data, to the host 1300.

The host control circuit 1210 may include a host interface.

The processor 1220 may control the overall operation of the controller 1200 and perform a logical operation. The processor 1220 may communicate with the host 1300 of FIG. 1 through the host control circuit 1210, and may communicate with the memory device 1100 of FIG. 1 through the flash control circuit 1250. Further, the processor 1220 may control the operation of the memory system 1000 by using the buffer memory 1230 as a working memory, a cache memory or a buffer. The processor 1220 may generate a command queue by rearranging a plurality of host commands received from the host 1300, depending on the priorities thereof, and may then control the flash control circuit 1250 based on the command queue. Further, the processor 1220 may determine whether map data corresponding to an address received from the host 1300 is present in the buffer memory 1230, and may then perform a map data load operation.

The processor 1220 may include a flash translation layer (FTL) 1221 and a map data control block 1222.

The FTL 1221 may store firmware in the buffer memory 1230, an additional memory (not illustrated) directly coupled to the processor 1220, or a storage space (storage area) in the processor 1220. The FTL 1221 may map a physical address, corresponding to the address (e.g., logical address) input from the host 1300 of FIG. 1, to the logical address during a write operation. Also, the FTL 1221 may check a physical address mapped to a logical address input from the host 1300 during a read operation. Here, such a mapping operation is performed based on the map data stored in the buffer memory 1230. When map data corresponding to the logical address input from the host 1300 is not stored in the buffer memory 1230, the FTL 1221 may control the buffer memory 1230 and the flash control circuit 1250 so that a map data load operation is performed.

Further, the FTL 1221 may generate a command queue for controlling the flash control circuit 1250 in response to a host command received from the host 1300.

The map data control block 1222 may control an operation of loading map data from the memory device 1100 to the buffer memory 1230. The map data control block 1222 may control the buffer memory 1230 so that some of pieces of map data stored in the buffer memory 1230 are transmitted to and stored in the host 1300.

During the map data load operation, the map data control block 1222 may check a history of the map data transmitted to the host 1300, and may then determine whether the same map data, as that stored in the host 1300, is present among the pieces of map data stored in the buffer memory 1230. When it is determined that the same map data as that stored in the host 1300 is also stored in the buffer memory 1230, the map data control block 1222 may select a map data storage area in which the same map data is stored as a target area (victim area) and then erase the selected victim area.

In an embodiment of the present disclosure, as illustrated in FIG. 2, the FTL 1221 and the map data control block 1222 are separately provided. However, in another embodiment, the map data control block 1222 may be configured to be included in the FTL 1221.

The buffer memory 1230 may be used as a working memory, a cache memory, or a buffer of the processor 1220. The buffer memory 1230 may store codes and commands that are executed by the processor 1220. The buffer memory 1230 may store data that is processed by the processor 1220. Also, the buffer memory 1230 may store map data required for a mapping operation performed by the processor 1220. The map data may be stored in a memory device (e.g., memory device 1100 of FIG. 1), and may be read and stored in the buffer memory 1230 in a power-on operation of the memory system 1000.

The buffer memory 1230 may include a map data storage block 1231, a write buffer 1232, and a read buffer 1233. The map data storage block 1231 may be configured to include a plurality of map data storage areas, which are capable of storing different pieces of map data, respectively. Some of a plurality of pieces of map data, stored in the map data storage block 1231, may be transmitted to the host (e.g., host 1300 of FIG. 1), and may be stored as host map data (e.g., host_map of FIG. 1) in a host memory (e.g., host memory 1320 of FIG. 1). The write buffer 1232 may temporarily store data received together with a write command from the host 1300, and may then transmit the temporarily stored data to the memory device 1100 when the write command is transmitted to the memory device 1100. The read buffer 1233 may temporarily store the data received from the memory device 1100 and transmit the temporarily stored data to the host 1300 during a read operation.

The buffer memory 1230 may include a static RAM (SRAM) or a dynamic RAM (DRAM).

The error correction circuit 1240 may perform an error correction operation. The error correction circuit 1240 may perform Error Correction Code (ECC) encoding based on data to be written to the memory device 1100 of FIG. 1 through the flash control circuit 1250. The ECC-encoded data may be transferred to the memory device 1100 through the flash control circuit 1250. The error correction circuit 1240 may perform ECC decoding on data received from the memory device 1100 through the flash control circuit 1250. In an embodiment, the error correction circuit 1240 may be included as the component of the flash control circuit 1250 in the flash control circuit 1250.

The flash control circuit 1250 may generate and output an internal command for controlling the memory device 1100 in response to the command queue generated by the processor 1220. The flash control circuit 1250 may control a write operation by transmitting the data, buffered in the write buffer 1232 of the buffer memory 1230 to the memory device 1100 during the write operation. In an embodiment, the flash control circuit 1250 may control an operation of buffering the data, read from the memory device 1100, in the read buffer 1233 of the buffer memory 1230 in response to the command queue during a read operation. Further, the flash control circuit 1250 may control the memory device 1100 so that the map data stored in the memory device 1100 is read and stored in the map data storage block 1231 of the buffer memory 1230 during a map data load operation.

The flash control circuit 1250 may include a flash interface.

Figure 3:
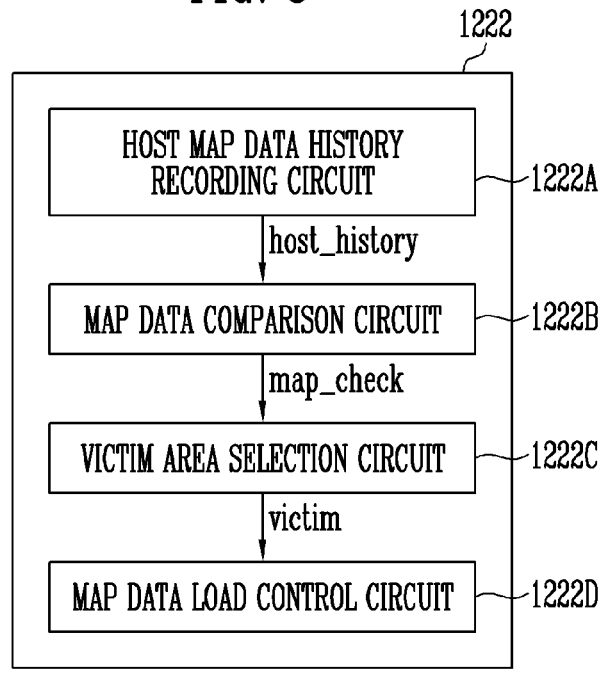
FIG. 3 is a block diagram illustrating a map data control block of FIG. 2 according to an embodiment.

FIG. 3 is a block diagram illustrating the map data control block 1222 of FIG. 2.

Referring to FIG. 3, the map data control block 1222 may include a host map data history recording circuit 1222A, a map data comparison circuit 1222B, a victim area selection circuit 1222C, and a map data load control circuit 1222D.

The host map data history recording circuit 1222A may store transmission information for map data, which is transmitted to a host (e.g., host 1300 of FIG. 1), among pieces of map data stored in a map data storage block 1231 of FIG. 2, and may output the stored map data transmission information host_history. The map data transmission information host_history may be information about the map data stored in the host memory 1320 of FIG. 1.

The map data comparison circuit 1222B may determine whether the same map data as that stored in the host memory 1320 is present in the map data stored in the map data storage block 1231 of FIG. 2, based on both the map data transmission information host_history, received from the host map data history recording circuit 1222A, and the map data, stored in the map data storage block 1231, and may output the result of determination as a map data check signal map_check.

The victim area selection circuit 1222C may select a map data storage area in which the same map data as that stored in the host memory 1320 is stored from among the plurality of map data storage areas included in the map data storage block 1231 of FIG. 2, as a target area (victim area) in which new map data is to be stored, based on the map data check signal map_check. Further, when it is determined, based on the map data check signal map_check, that the same map data as that stored in the host memory 1320 is not stored in the map data storage block 1231, the victim area selection circuit 1222C may select, as the victim area, a map data storage area storing the oldest map data or the least recently referenced map data, among pieces of map data stored in the plurality of map data storage areas, according to a FIFO or LRU algorithm.

The map data load control circuit 1222D may control the buffer memory 1230 and the host control circuit 1210 so that some of the map data stored in the map data storage block 1231 is stored, as host map data, in the host memory (e.g., 1320 of FIG. 1).

Further, the map data load control circuit 1222D may control the map data storage block 1231 so that the pieces of map data stored in the selected victim area are released and erased based on information for the victim area selected by the victim area selection circuit 1222C. Therefore, the selected victim area is in an erased state.

Figure 4:
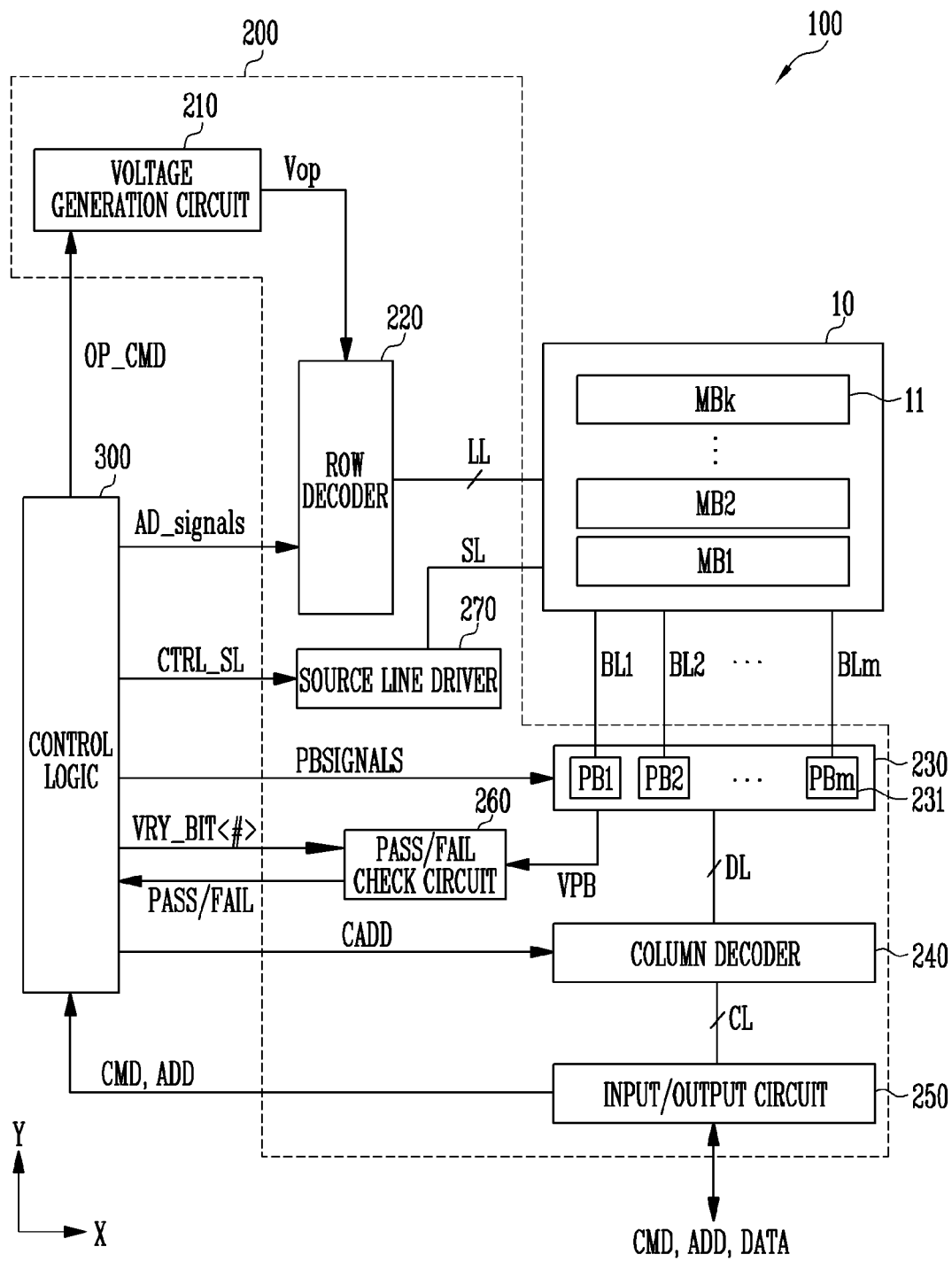
FIG. 4 is a diagram illustrating a semiconductor memory, such as that of FIG. 1.

FIG. 4 is a diagram illustrating an example of the semiconductor memory 100 of FIG. 1.

Referring to FIG. 4, the semiconductor memory 100 may include a memory cell array 10 in which data is stored. The semiconductor memory 100 may include a peripheral circuit 200 configured to perform a program operation for storing data in the memory cell array 10, a read operation for outputting the stored data, and an erase operation for erasing the stored data. The semiconductor memory 100 may include a control logic 300 which controls the peripheral circuits 200 under the control of a controller (e.g., 1200 of FIG. 1).

The memory cell array 10 may include a plurality of memory blocks MB1 to MBk 11 (k is a positive integer). Local lines LL and bit lines BL1 to BLm (where m is a positive integer) may be coupled to each of the memory blocks MB1 to MBk 11. For example, the local lines LL may include a first select line, a second select line, and a plurality of word lines arranged between the first and second select lines. Also, the local lines LL may include dummy lines arranged between the first select line and the word lines and between the second select line and the word lines. Here, the first select line may be a source select line, and the second select line may be a drain select line. For example, the local lines LL may include the word lines, the drain and source select lines, and source lines SL. For example, the local lines LL may further include dummy lines. For example, the local lines LL may further include pipelines. The local lines LL may be coupled to each of the memory blocks MB1 to MBk 11, and the bit lines BL1 to BLm may be coupled in common to the memory blocks MB1 to MBk 11. The memory blocks MB1 to MBk 11 may each be implemented in a two-dimensional (2D) or three-dimensional (3D) structure. For example, memory cells in the memory blocks 11 having a 2D structure may be horizontally arranged on a substrate. For example, memory cells in the memory blocks 11 having a 3D structure may be vertically stacked on the substrate.

At least one memory block (e.g., MB1) of the memory blocks MB1 to MBk 11 may be defined as a system memory block, and map data may be stored in the system memory block.

The peripheral circuit 200 may perform program, read, and erase operations on a selected memory block 11 under the control of the control logic 300. For example, the peripheral circuit 200 may include a voltage generation circuit 210, a row decoder 220, a page buffer group 230, a column decoder 240, an input/output circuit 250, a pass/fail check circuit 260, and a source line driver 270.

The voltage generation circuit 210 may generate various operating voltages Vop that are used for program, read, and erase operations in response to an operation signal OP_CMD. Further, the voltage generation circuit 210 may selectively discharge the local lines LL in response to the operation signal OP_CMD. For example, the voltage generation circuit 210 may generate various voltages such as a program voltage, a verify voltage, a pass voltage, and a select transistor operating voltage under the control of the control logic 300.

The row decoder 220 may transfer the operating voltages Vop to the local lines LL coupled to the selected memory block 11 in response to control signals AD_signals. For example, the row decoder 220 may selectively apply the operating voltages (e.g., program voltage, verify voltage, pass voltage, and the like), generated by the voltage generation circuit 210, to the word lines of the local lines LL in response to row decoder control signals AD_signals.

The row decoder 220 may apply the program voltage, generated by the voltage generation circuit 210, to a selected word line of the local lines LL in response to the control signals AD_signals during a program voltage application operation, and may apply the pass voltage, generated by the voltage generation circuit 210, to the remaining word lines, that is, unselected word lines. Also, the row decoder 220 may apply the read voltage, generated by the voltage generation circuit 210, to a selected word line of the local lines LL in response to the control signals AD_signals during a read operation, and may apply the pass voltage, generated by the voltage generation circuit 210, to the remaining word lines, that is, unselected word lines.

The page buffer group 230 may include a plurality of page buffers PB1 to PBm 231 coupled to the bit lines BL1 to BLm. The page buffers PB1 to PBm 231 may be operated in response to the page buffer control signals PBSIGNALS. For example, the page buffers PB1 to PBm 231 may temporarily store data to be programmed during a program operation or may sense voltages or currents of the bit lines BL1 to BLm during a read or verify operation.

The column decoder 240 may transfer data between the input/output circuit 250 and the page buffer group 230 in response to a column address CADD. For example, the column decoder 240 may exchange data with the page buffers 231 through data lines DL or may exchange data with the input/output circuit 250 through column lines CL.

The input/output circuit 250 may transmit an internal command CMD and an address ADD, received from a controller (e.g., 1200 of FIG. 1), to the control logic 300, or may exchange data DATA with the column decoder 240.

During a read operation or a verify operation, the pass/fail check circuit 260 may generate a reference current in response to an enable bit VRY_BIT<#>, compare a sensing voltage VPB, received from the page buffer group 230, with a reference voltage, generated using the reference current, and then output a pass signal PASS or a fail signal FAIL.

The source line driver 270 may be coupled to memory cells included in the memory cell array 10 through a source line SL, and may control a voltage to be applied to the source line SL. The source line driver 270 may receive a source line control signal CTRL_SL from the control logic 300, and may control the source line voltage to be applied to the source line SL in response to the source line control signal CTRL_SL.

The control logic 300 may control the peripheral circuits 200 by outputting the operation signal OP_CMD, the control signals AD_signals, the page buffer control signals PBSIGNALS, and the enable bit VRY_BIT<#> in response to the internal command CMD and the address ADD. In addition, the control logic 300 may determine whether a verify operation has passed or fails in response to the pass or fail signal PASS or FAIL.

Figure 5:
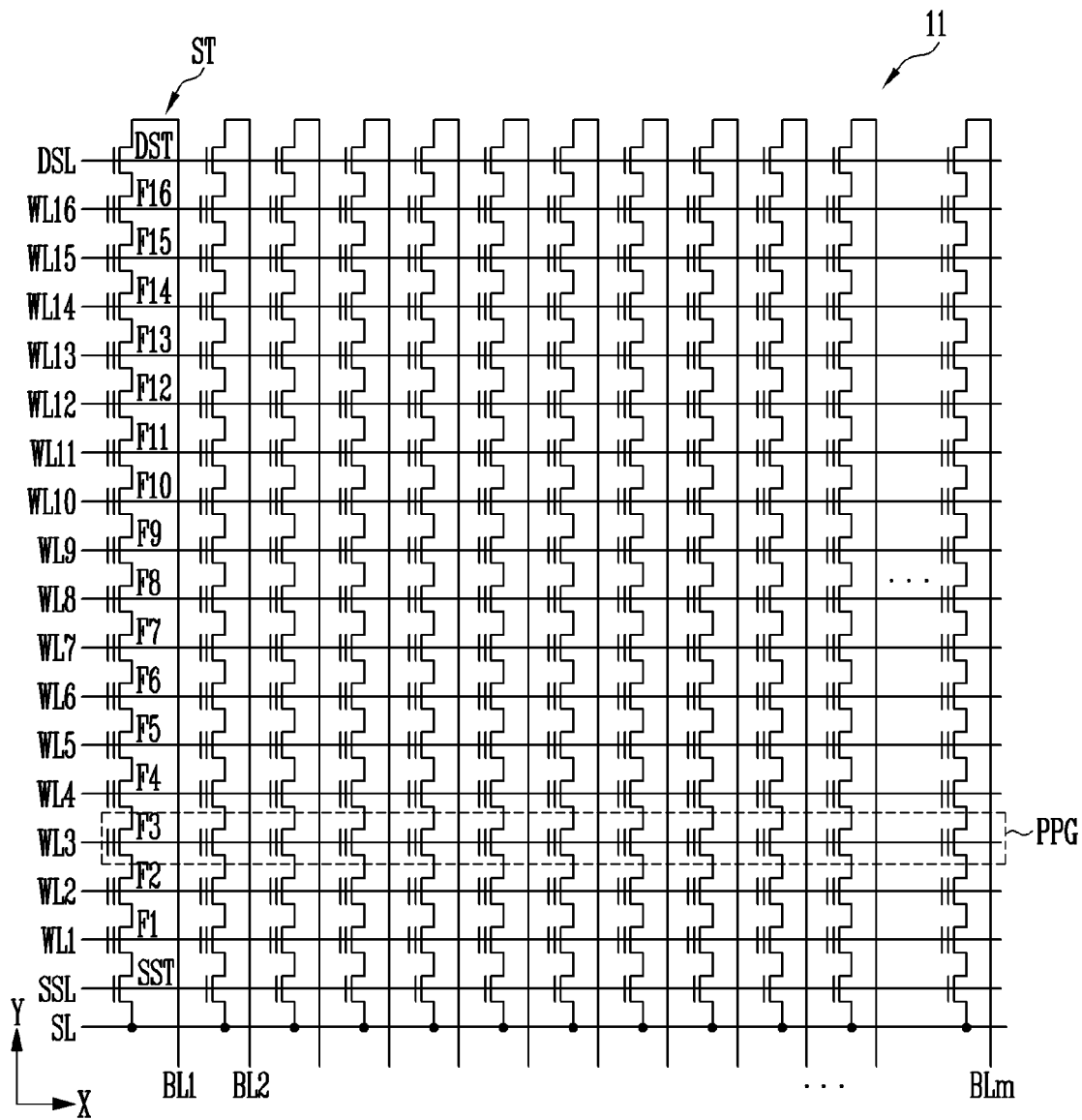
FIG. 5 is a diagram illustrating and structure of a memory block according to an embodiment.

FIG. 5 is a diagram illustrating a structure of the memory block of FIG. 4 according to an embodiment.

Referring to FIG. 5, a memory block 11 may be configured such that a plurality of word lines, which are arranged in parallel, are coupled between a first select line and a second select line. Here, the first select line may be a source select line SSL and the second select line may be a drain select line DSL. In detail, the memory block 11 may include a plurality of strings ST coupled between bit lines BL1 to BLm and a source line SL. The bit lines BL1 to BLm may be respectively coupled to the strings ST, and the source line SL may be coupled in common to the strings ST. Since the strings ST may have the same configuration, a string ST coupled to the first bit line BL1 will be described in detail by way of example.

The string ST may include a source select transistor SST, a plurality of memory cells F1 to F16, and a drain select transistor DST, which are connected in series between the source line SL and the first bit line BL1. One string ST may include one or more source select transistors SST and drain select transistors DST, and may include more memory cells than the memory cells F1 to F16 illustrated in the drawing.

A source of the source select transistor SST may be coupled to the source line SL and a drain of the drain select transistor DST may be coupled to the first bit line BL1. The memory cells F1 to F16 may be connected in series between the source select transistor SST and the drain select transistor DST. Gates of the source select transistors SST included in different strings ST may be coupled to a source select line SSL, gates of the drain select transistors DST may be coupled to a drain select line DSL, and gates of the memory cells F1 to F16 may be coupled to a plurality of word lines WL1 to WL16. A group of memory cells coupled to the same word line, among the memory cells included in different strings ST, may be referred to as a physical page PPG. Therefore, a number of physical pages PPG that are identical to the number of word lines WL1 to WL16 may be included in the memory block 11.

One memory cell may store one bit of data. This is typically referred to as a single-level cell (SLC). In this case, one physical page PPG may store data corresponding to one logical page LPG. The data corresponding to one logical page LPG may include a number of data bits identical to the number of cells included in one physical page PPG. Further, one memory cell may store two or more bits of data. This cell is typically referred to as a multi-level cell (MLC). Here, one physical page PPG may store data corresponding to two or more logical pages LPG.

Figure 6:
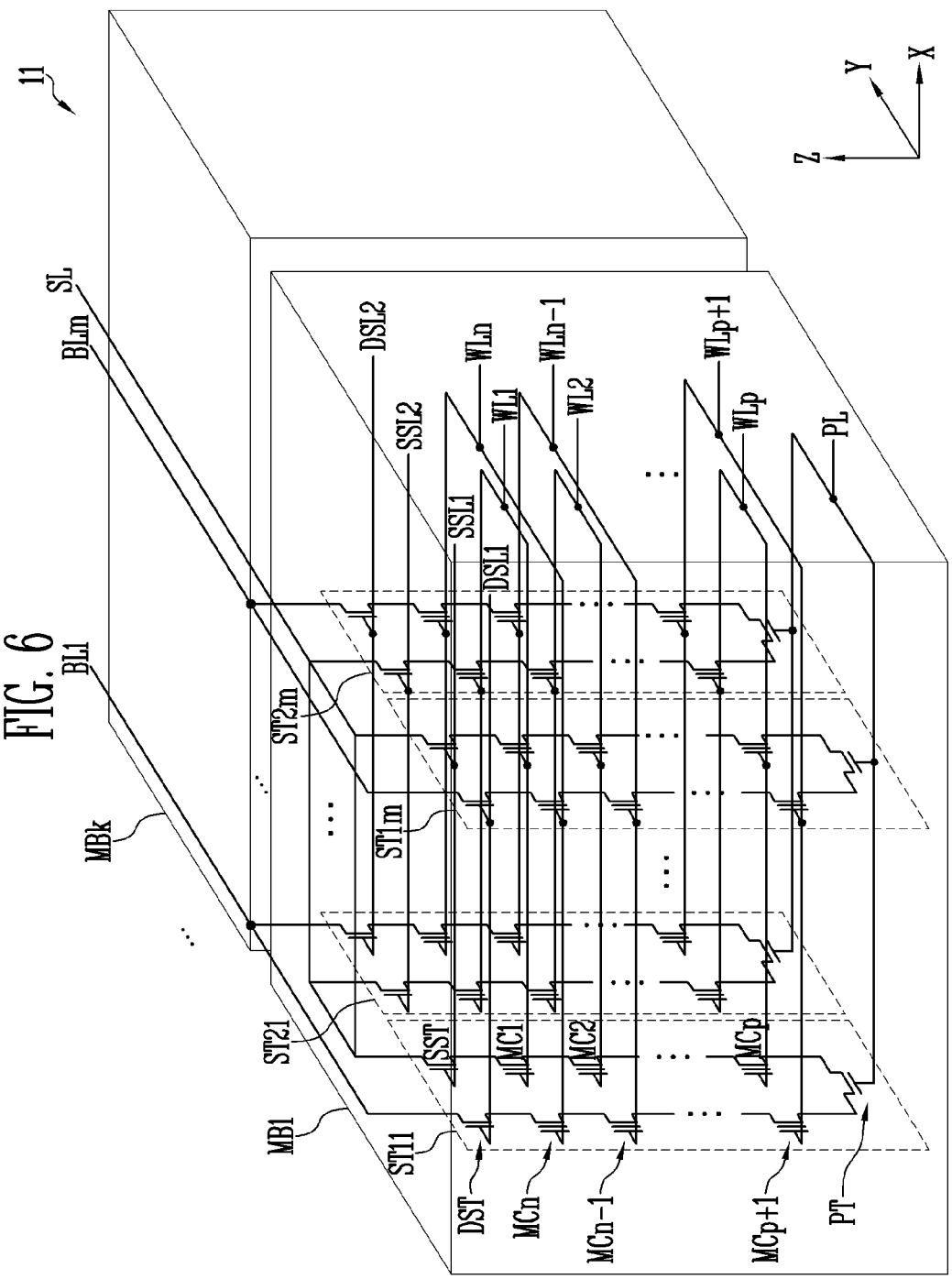
FIG. 6 is a diagram illustrating an example of a memory block having a 3D structure.

FIG. 6 is a diagram illustrating an example of a memory block having a three-dimensional (3D) structure.

Referring to FIG. 6, a memory cell array 10 may include a plurality of memory blocks MB1 to MBk 11. Each of the memory blocks 11 may include a plurality of strings ST11 to ST1m and ST21 to ST2m. In an embodiment, each of the strings ST11 to ST1m and ST21 to ST2m may be formed in a 'U' shape. In the first memory block MB1, m strings may be arranged in a row direction (e.g., X direction). Although, in FIG. 6, two strings are illustrated as being arranged in a column direction (e.g., Y direction), this is merely an example; three or more strings may be arranged in the column direction (e.g., Y direction) in other embodiments.

Each of the plurality of strings ST11 to ST1m and ST21 to ST2m may include at least one source select transistor SST, first to n-th memory cells MC1 to MCn, a pipe transistor PT, and at least one drain select transistor DST.

The source and drain select transistors SST and DST and the memory cells MC1 to MCn may have a similar structure. For example, each of the source and drain select transistors SST and DST and the memory cells MC1 to MCn may include a channel layer, a tunnel insulating layer, a charge trap layer, and a blocking insulating layer. For example, a pillar for providing the channel layer may be provided in each string. For example, a pillar for providing at least one of the channel layer, the tunnel insulating layer, the charge trap layer, and the blocking insulating layer may be provided in each string.

The source select transistor SST of each string may be coupled between a source line SL and memory cells MC1 to MCp.

In an embodiment, source select transistors of strings arranged in the same row may be coupled to a source select line extending in the row direction, and source select transistors of strings arranged in different rows may be coupled to different source select lines. In FIG. 6, the source select transistors of the strings ST11 to ST1m in a first row may be coupled to a first source select line SSL1. The source select transistors of the strings ST21 to ST2m in a second row may be coupled to a second source select line SSL2.

In other embodiments, the source select transistors of the strings ST11 to ST1m and ST21 to ST2m may be coupled in common to one source select line.

The first to n-th memory cells MC1 to MCn in each string may be coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp may be sequentially arranged in a vertical direction (e.g., Z direction), and may be coupled in series between the source select transistor SST and the pipe transistor PT. The p+1-th to n-th memory cells MCp+1 to MCn may be sequentially arranged in the vertical direction (e.g., Z direction), and may be coupled in series between the pipe transistor PT and the drain select transistor DST. The first to p-th memory cells MC1 to MCp and the p+1-th to n-th memory cells MCp+1 to MCn may be coupled to each other through the pipe transistor PT. Gates of the first to n-th memory cells MC1 to MCn of each string may be coupled to first to n-th word lines WL1 to WLn, respectively.

In an embodiment, at least one of the first to n-th memory cells MC1 to MCn may be used as a dummy memory cell. When the dummy memory cell is provided, the voltage or current of the corresponding string may be stably controlled. A gate of the pipe transistor PT of each string may be coupled to a pipeline PL.

The drain select transistor DST of each string may be coupled between the corresponding bit line and the memory cells MCp+1 to MCn. Strings arranged in the row direction may be coupled to the corresponding drain select line extending in the row direction. The drain select transistors of the strings ST11 to ST1m in the first row may be coupled to a drain select line DSL1. The drain select transistors of the strings ST21 to ST2m in the second row may be coupled to a second drain select line DSL2.

The strings arranged in the column direction may be coupled to bit lines extending in the column direction. In FIG. 6, the strings ST11 and ST21 in a first column may be coupled to a first bit line BL1. The strings ST1m and ST2m in an m-th column may be coupled to an m-th bit line BLm.

Among strings arranged in the row direction, memory cells coupled to the same word line may constitute one page. For example, memory cells coupled to the first word line WL1, among the strings ST11 to ST1m in the first row, may constitute one page. Among the strings ST21 to ST2m in the second row, memory cells coupled to the first word line WL1 may constitute one additional page. Strings arranged in the direction of a single row may be selected by selecting any one of the drain select lines DSL1 and DSL2. One page may be selected from the selected strings by selecting any one of the word lines WL1 to WLn.

Figure 7:
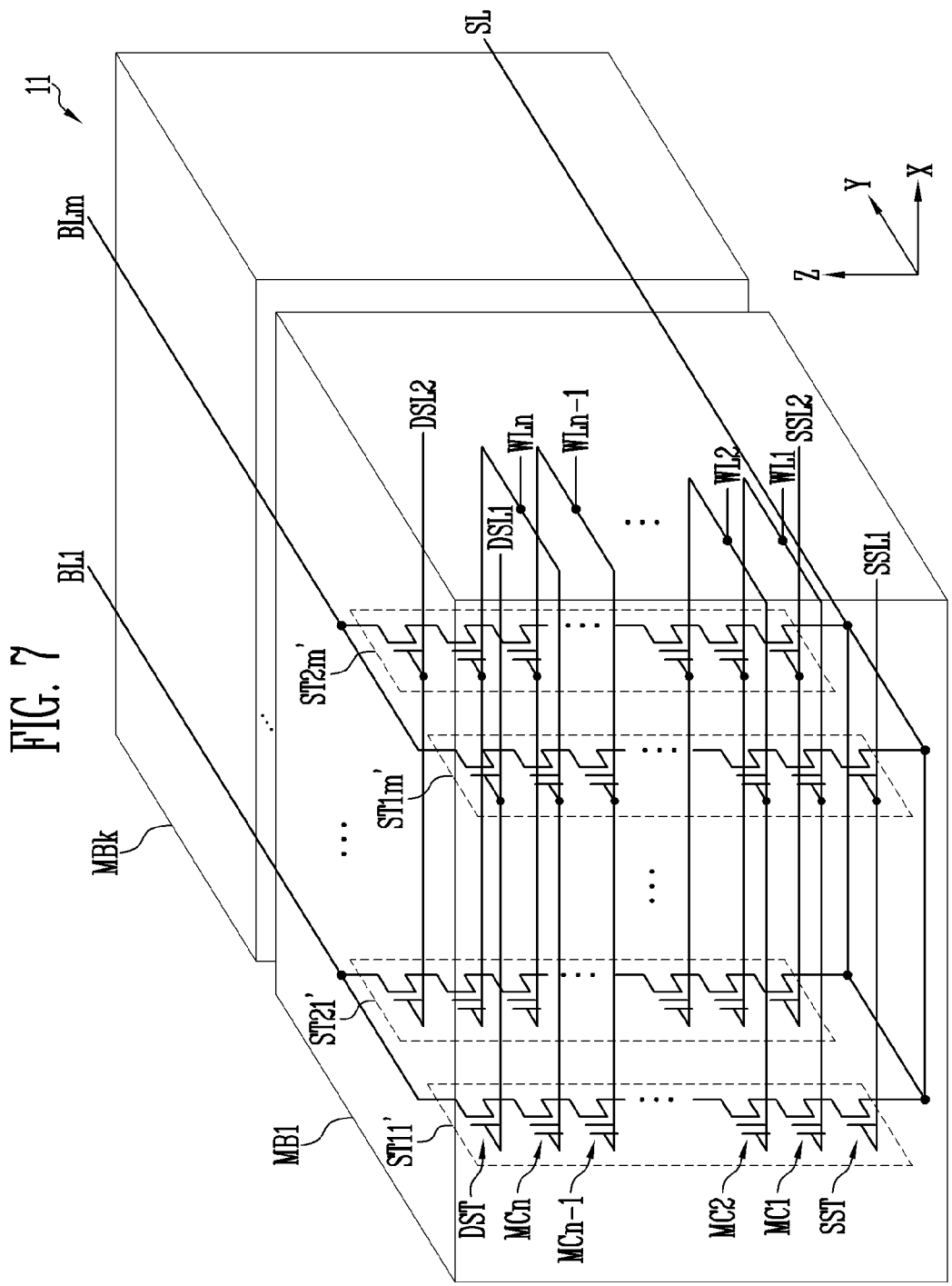
FIG. 7 is a diagram illustrating another example of a memory block having a 3D structure.

FIG. 7 is a diagram illustrating an example of a memory block having a 3D structure.

Referring to FIG. 7, a memory cell array 10 may include a plurality of memory blocks MB1 to MBk 11. Each of the memory blocks 11 may include a plurality of strings ST11' to ST1m' and ST21' to ST2m'. Each of the strings ST11' to ST1*m*' and ST21' to ST2*m*' may extend along a vertical direction (e.g., Z direction). In the memory block 11, m strings may be arranged in a row direction (e.g., X direction). Although, in FIG. 7, two strings are illustrated as being arranged in a column direction (e.g., Y direction), this is merely an example; three or more strings may be arranged in the column direction (e.g., Y direction) in other embodiments.

Each of the strings ST11' to ST1*m*' and ST21' to ST2*m*' may include at least one source select transistor SST, first to n-th memory cells MC1 to MCn, and at least one drain select transistor DST.

The source select transistor SST of each string may be coupled between a source line SL and the memory cells MC1 to MCn. Source select transistors of strings arranged in the same row may be coupled to the same source select line. The source select transistors of the strings ST11' to ST1*m*' arranged in a first row may be coupled to a first source select line SSL1. The source select transistors of the strings ST21' to ST2*m*' arranged in a second row may be coupled to a second source select line SSL2. In an embodiment, the source select transistors of the strings ST11' to ST1*m*' and ST21' to ST2*m*' may be coupled in common to a single source select line.

The first to n-th memory cells MC1 to MCn in each string may be coupled in series between the source select transistor SST and the drain select transistor DST. Gates of the first to n-th memory cells MC1 to MCn may be coupled to first to n-th word lines WL1 to WLn, respectively.

In an embodiment, at least one of the first to n-th memory cells MC1 to MCn may be used as a dummy memory cell. When the dummy memory cell is provided, the voltage or current of the corresponding string may be stably controlled. Thus, the reliability of data stored in the memory block 11 may be improved.

The drain select transistor DST of each string may be coupled between the corresponding bit line and the memory cells MC1 to MCn. The drain select transistors DST of strings arranged in the row direction may be coupled to a drain select line extending along the row direction. The drain select transistors DST of the strings ST11' to ST1*m*' in the first row may be coupled to a first drain select line DSL1. The drain select transistors DST of the strings ST21' to ST2*m*' in the second row may be coupled to a second drain select line DSL2.

Figure 8:
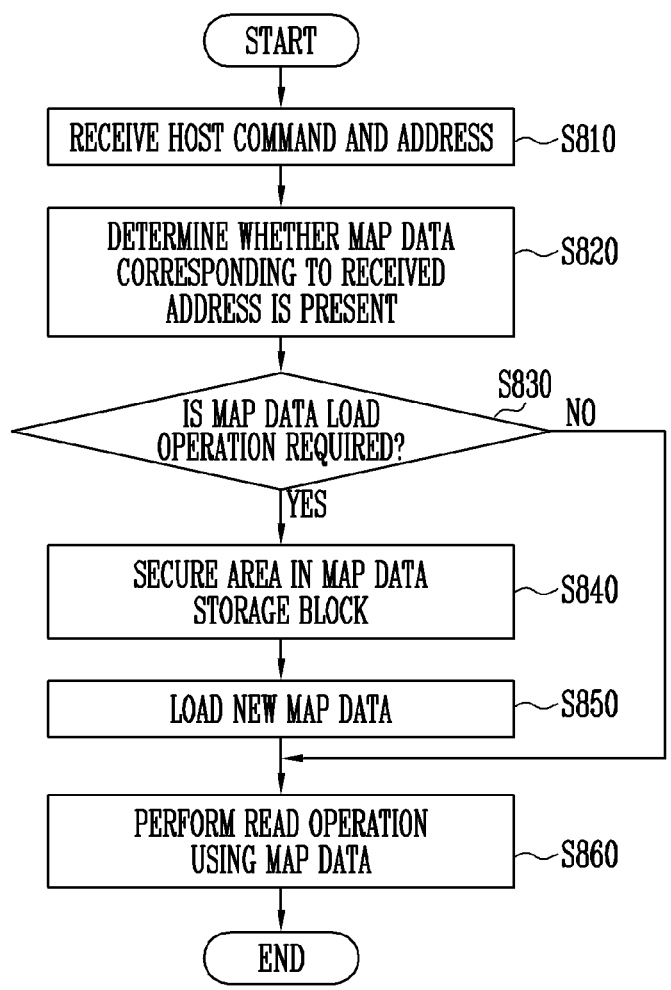
FIG. 8 is a flowchart illustrating an operation of a memory system according to an embodiment of the present disclosure.

FIG. 8 is a flowchart illustrating an operation of a memory system according to an embodiment of the present disclosure. Such method is described below with additional reference to FIGS. 1-7.

Such method is described in the context of a case in which a host command Host_CMD corresponding to a read operation is received from the host 1300 is described by way of example.

The host 1300 generates and outputs a host command Host_CMD and an address corresponding to the read operation, and the controller 1200 receives the host command Host_CMD and the address from the host 1300 at step S810.

The processor 1220 of the controller 1200 generates a command queue in response to the received host command Host_CMD. Also, the processor 1220 determines whether map data corresponding to the received address is stored in the map data storage block 1231 of the buffer memory 1230 so as to perform a mapping operation on the received address at step S820.

Based on the result of the above-described checking at step S820, whether an operation of loading new map data is required is determined at step S830. For example, when it is determined that the map data load operation is required because map data corresponding to the received address is not stored in the map data storage block 1231 (Yes at step S830), an operation of securing a storage space (storage area) for storing new map data in the map data storage block 1231 is performed at step S840. The operation of securing the storage area will be described in detail later.

Next, the flash control circuit 1250 may control the memory device 1100 so that a map data read operation is performed. A selected semiconductor memory 100 of the memory device 1100 may read a plurality of pieces of map data that include map data, corresponding to a logical address received from the host 1300, from pieces of map data stored in a system memory block (e.g., MB1) among a plurality of memory blocks, and may transmit the read map data to the controller 1200.

The flash control circuit 1250 stores the plurality of pieces of map data, received from the selected semiconductor memory 100, in the secured storage area of the map data storage block 1231, and then loads new map data into the secured storage area at step S850.

The controller 1200 controls the memory device 1100 so that the memory device 1100 performs a read operation using the map data stored in the map data storage block 1231 at step S860.

For example, the processor 1220 of the controller 1200 maps a logical address received from the host 1300 to a physical address using the new map data. The flash control circuit 1250 generates an internal command CMD corresponding to the read operation of the semiconductor memory 100 in response to the command queue, and transmits the internal command CMD, together with the mapped address ADD, to the semiconductor memory 100. The semiconductor memory 100 performs a read operation on a memory block selected from among the plurality of memory blocks 11 in response to the internal command CMD and the address ADD, and transmits the read data DATA to the controller 1200.

The read buffer 1233 of the controller 1200 buffers (i.e., temporarily stores) the read data, received from the semiconductor memory 100, and the host control circuit 1210 transmits the data, buffered in the read buffer 1233, to the host 1300, thus completing the read operation.

When it is determined at step S830 that the above-described operation of loading new map data is not required because the map data corresponding to the received address is stored in the map data storage block 1231 (No at step S830), the above-described step S860 may be performed.

Figure 9:
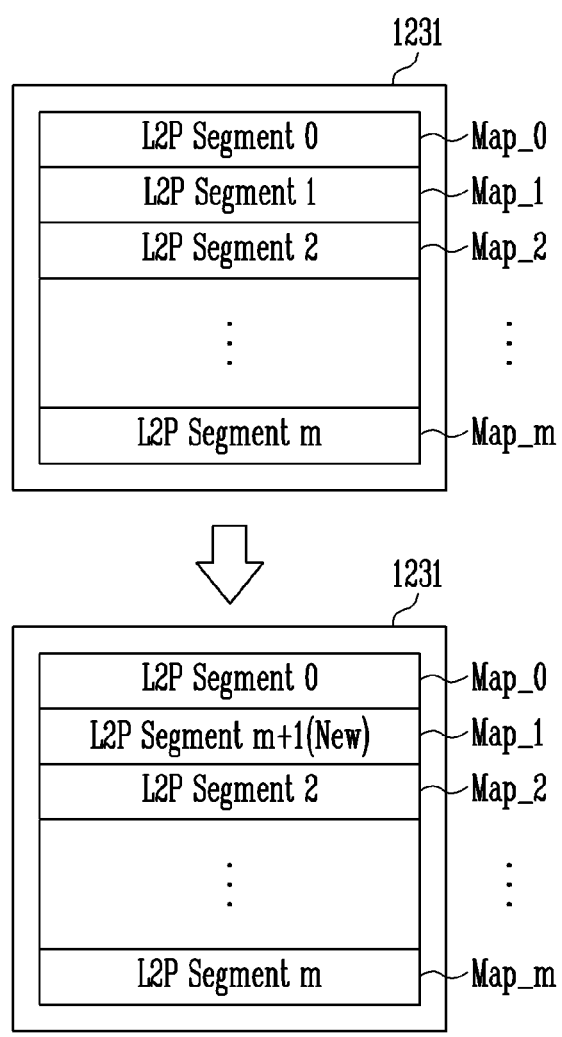
FIG. 9 is a diagram illustrating a load operation performed on a map data storage block according to an embodiment of the present disclosure.

FIG. 9 is a diagram illustrating a load operation performed on a map data storage block.

Referring to FIG. 9, the map data storage block 1231 may include a plurality of map data storage areas Map_0 to Map_m, and different pieces of map data L2P Segment 0 to L2P Segment m may be stored in the plurality of map data storage areas Map_0 to Map_m, respectively. For example, in the map data storage area Map0, the map data L2P Segment 0 may be stored, and in the map data storage area Map_m, the map data L2P Segment m may be stored.

During a map data load operation, when the map data storage area Map_1 is selected as a victim area, the map data L2P Segment 1, zo stored in the map data storage area Map_1, may be erased, and new map data L2P Segment m+1(New) may be stored in the map data storage area Map_1.

Figure 10:
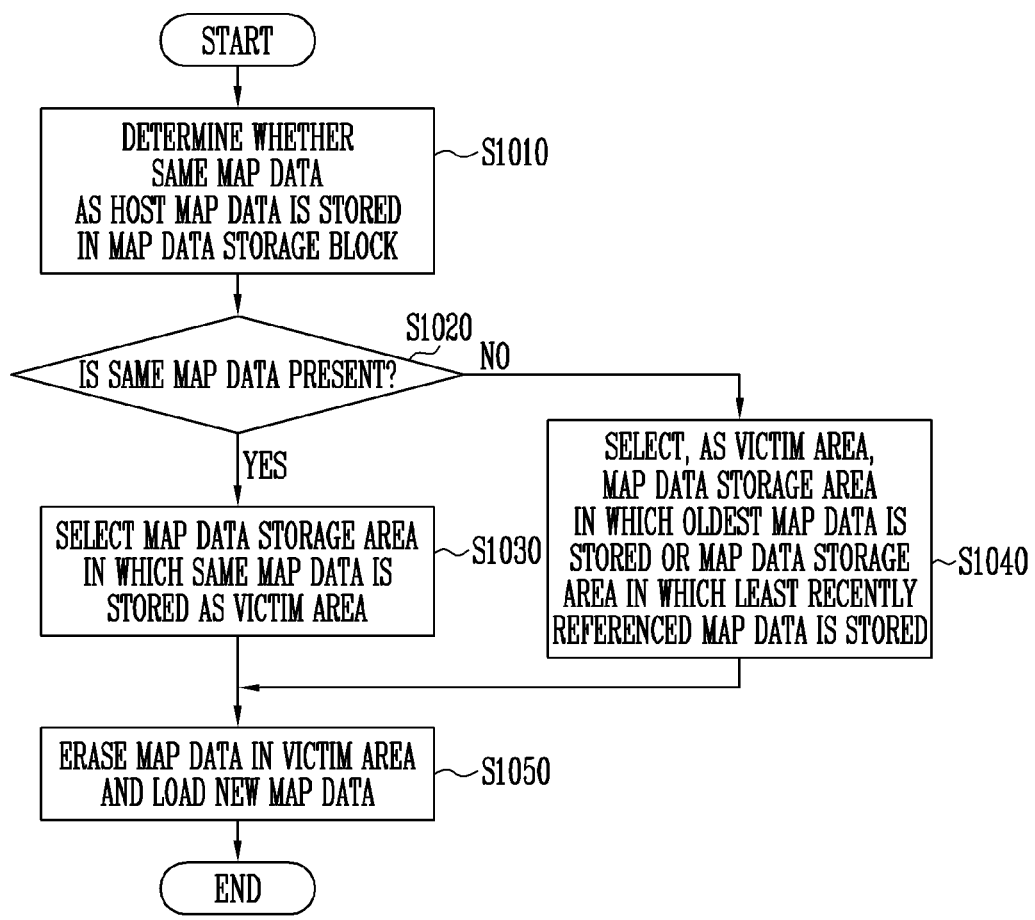
FIG. 10 is a flowchart illustrating an operation of securing a space in a map data storage block and loading map data into the secured space according to an embodiment of the present disclosure.

FIG. 10 is a flowchart illustrating an operation of securing a space in a map data storage block and loading map data into the secured space.

Referring to FIGS. 2, 3, and 8, in addition to FIG. 10, the map data comparison circuit 1222B determines, at step S1010, whether the same map data as that stored in the host memory 1320 is present in map data stored in the map data storage block 1231, based on both map data transmission information host_history received from the host map data history recording circuit 1222A and map data stored in the map data storage block 1231, and then outputs a map data check signal map_check also at step S1010.

Based on the map data check signal map_check, it is determined at step S1020, whether the same data is present in the map data storage block 1231 and the host memory 1320.

When, as a result of the determination operation performed at S1020, the same data is present in the map data storage block 1231 and the host memory 1320 (Yes at step S1020), the victim area selection circuit 1222C may select the map data storage area of the map data storage block 1231 storing the same map data as the host memory 1320, as the victim area, at step S1030.

When, as a result of the determination operation performed at step S1020, the same data is not present in the map data storage block 1231 and in the host memory 1320 (No at step S1020), the victim area selection circuit 1222C may select, as the victim area, a map data storage area storing the oldest map data or the least recently referenced map data, among pieces of map data stored in the plurality of map data storage areas, according to the FIFO or the LRU algorithm at step S1040.

The map data load control circuit 1222D controls the map data storage block 1231 so that pieces of map data, stored in the selected victim area, are released and erased based on information for the victim area selected by the victim area selection circuit 1222C. Thereafter, new map data is stored in the map data storage area selected as the victim area at step S1050.

In accordance with embodiments of the present disclosure, when a storage space (storage area) in which new map data is to be stored is secured so as to load new map data into the buffer memory 1230, a map data storage area, in which the same map data as that of the host memory is stored, may be preferentially selected and then a storage area may be secured. Therefore, the map data overlapping that of the host memory may be erased, and thus map data may be efficiently managed.

Figure 11:
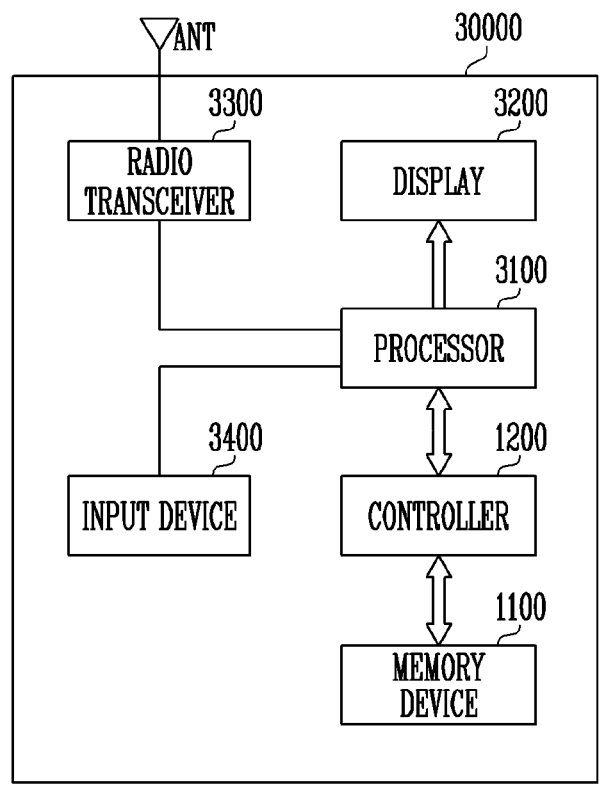
FIG. 11 is a diagram illustrating an embodiment of a memory system.

FIG. 11 is a diagram illustrating an embodiment of a memory system.

Referring to FIG. 11, a memory system 30000 may be embodied in a cellular phone, a smartphone, a tablet PC, a personal digital assistant (PDA) or a wireless communication device. The memory system 30000 may include a memory device 1100 and a controller 1200 capable of controlling the operation of the memory device 1100. The controller 1200 may control a data access operation, e.g., a program, erase, or read operation, of the memory device 1100 under the control of a processor 3100.

Data programmed in the memory device 1100 may be output through a display 3200 under the control of the controller 1200.

A radio transceiver 3300 may send and receive radio signals through an antenna ANT. For example, the radio transceiver 3300 may convert a radio signal received through the antenna ANT into a signal which may be processed by the processor 3100. Therefore, the processor 3100 may process a signal output from the radio transceiver 3300 and transmit the processed signal to the controller 1200 or the display 3200. The controller 1200 may program a signal processed by the processor 3100 to the memory device 1100. Furthermore, the radio transceiver 3300 may convert a signal output from the processor 3100 into a radio signal, and output the changed radio signal to the external device through the antenna ANT. An input device 3400 may be used to input a control signal for controlling the operation of the processor 3100 or data to be processed by the processor 3100. The input device 3400 may be implemented as a pointing device such as a touch pad or a computer mouse, a keypad or a keyboard. The processor 3100 may control the operation of the display 3200 such that data output from the controller 1200, data from the radio transceiver 3300 or data from the input device 3400 is output through the display 3200.

In an embodiment, the controller 1200 capable of controlling the operation of the memory device 1100 may be implemented as a part of the processor 3100 or a chip provided separately from the processor 3100. Further, the controller 1200 may be implemented through the example of the controller illustrated in FIG. 2.

Figure 12:
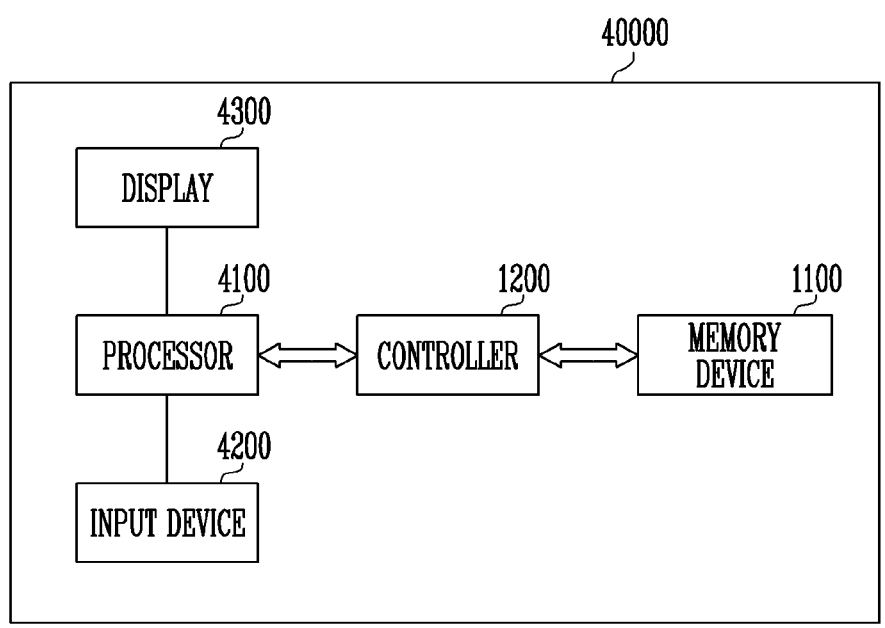
FIG. 12 is a diagram illustrating an embodiment of a memory system.

FIG. 12 is a diagram illustrating an embodiment of a memory system.

Referring to FIG. 12, a memory system 40000 may be embodied in a personal computer, a tablet PC, a net-book, an e-reader, a personal digital assistant (PDA), a portable multimedia player (PMP), an MP3 player, or an MP4 player.

The memory system 40000 may include a memory device 1100 and a controller 1200 capable of controlling the data processing operation of the memory device 1100.

A processor 4100 may output data stored in the memory device 1100 through a display 4300, according to data input from an input device 4200. For example, the input device 4200 may be implemented as a point device such as a touch pad or a computer mouse, a keypad or a keyboard.

The processor 4100 may control the overall operation of the memory system 40000 and control the operation of the controller 1200. In an embodiment, the controller 1200 capable of controlling the operation of the memory device 1100 may be implemented as a part of the processor 4100 or a chip provided separately from the processor 4100. Further, the controller 1200 may be implemented through the example of the controller illustrated in FIG. 2.

Figure 13:
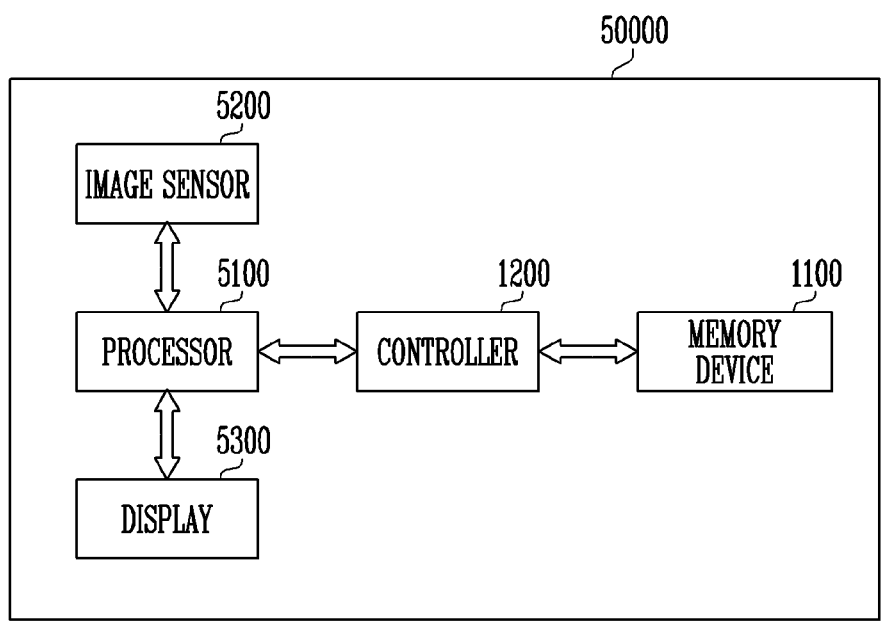
FIG. 13 is a diagram illustrating an embodiment of a memory system.

FIG. 13 is a diagram illustrating an embodiment of a memory system.

Referring to FIG. 13, a memory system 50000 may be embodied in an image processing device, e.g., a digital camera, a portable phone provided with a digital camera, a smartphone provided with a digital camera, or a tablet PC provided with a digital camera.

The memory system 50000 may include a memory device 1100 and a controller 1200 capable of controlling a data processing operation, e.g., a program, erase, or read operation, of the memory device 1100.

An image sensor 5200 of the memory system 50000 may convert an optical image into digital signals. The converted digital signals may be transmitted to a processor 5100 or the controller 1200. Under the control of the processor 5100, the converted digital signals may be output through a display 5300 or stored in the memory device 1100 through the controller 1200. Data stored in the memory device 1100 may be output through the display 5300 under the control of the processor 5100 or the controller 1200.

In an embodiment, the controller 1200 capable of controlling the operation of the memory device 1100 may be implemented as a part of the processor 5100, or a chip provided separately from the processor 5100. Further, the controller 1200 may be implemented through the example of the controller illustrated in FIG. 2.

Figure 14:
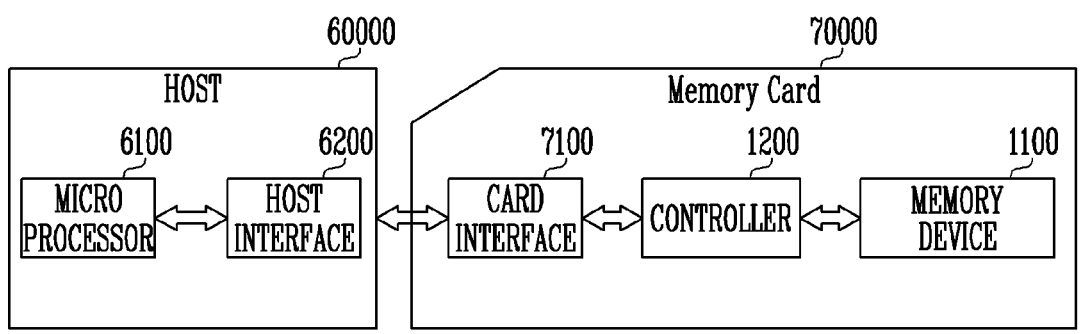
FIG. 14 is a diagram illustrating an embodiment of a memory system.

FIG. 14 is a diagram illustrating an embodiment of a memory system.

Referring to FIG. 14, a memory system 70000 may be embodied in a memory card or a smart card. The memory system 70000 may include a memory device 1100, a controller 1200 and a card interface 7100.

The controller 1200 may control data exchange between the memory device 1100 and the card interface 7100. In an embodiment, the card interface 7100 may be a secure digital (SD) card interface or a multi-media card (MMC) interface, but it is not limited thereto. Further, the controller 1200 may be implemented through the example of the controller illustrated in FIG. 2.

The card interface 7100 may interface data exchange between a host 60000 and the controller 1200 according to a protocol of the host 60000. In an embodiment, the card interface 7100 may support a universal serial bus (USB) protocol, and an interchip (IC)-USB protocol. Here, the card interface may refer to hardware capable of supporting a protocol which is used by the host 60000, software installed in the hardware, or a signal transmission method.

When the memory system 70000 is coupled to a host interface 6200 of the host 60000 such as a PC, a tablet PC, a digital camera, a digital audio player, a cellular phone, console video game hardware or a digital set-top box, the host interface 6200 may perform data communication with the memory device 1100 through the card interface 7100 and the controller 1200 under the control of a microprocessor 6100.

According to embodiments of present disclosure, the same map data as that stored in a host memory is erased from pieces of data stored in a controller and new map data is loaded during a map data load operation of a memory system, thus improving the efficiency of the map data load operation of the memory system.

While various embodiments of the present disclosure have been illustrated and disclosed, those skilled in the art will appreciate in light of the present disclosure that various modifications, additions and substitutions are possible, without departing from the spirit and scope of the present invention. Therefore, the scope of the present invention is defined by the appended claims and equivalents thereof rather than by the description preceding them.

In the above-discussed embodiments, steps may be selectively performed or skipped. In addition, the steps in each embodiment may not always be performed in regular order. Furthermore, the embodiments disclosed herein aim to help those with ordinary knowledge in this art more clearly understand the present invention rather than aiming to limit the bounds of the present invention.

What is claimed is:

1. A memory controller for controlling a memory device, the memory controller comprising:
   a buffer memory configured to store map data including mapping information of logical addresses of data provided from an external host and physical addresses of memory cells included in the memory device, wherein the physical addresses correspond to the logical addresses, respectively;
   a host control circuit configured to provide host map data which includes some of the map data to the external host;
   a map data control block configured to:
   receive a read request from the external host, and
   check a history of the map data transmitted to the external host in order to determine from the history that same map data is stored in both the external host and the buffer memory, wherein the same map data includes target mapping information corresponding to a logical address of the read request; and
   a flash control circuit configured to acquire the target mapping information and process the read request according to the target mapping information.

2. The memory controller of claim 1, wherein the map data control block comprises a host map data history recording circuit configured to store the history of the map data as transmission information of the host map data provided to the external host.

3. The memory controller of claim 1, wherein the map data control block erases the same map data from the buffer memory in response to performing a read operation corresponding to the read request.

4. An operating method for a memory controller which controls a memory device and comprises a buffer memory which includes a plurality of map data storage areas to store map data, wherein the map data includes mapping information of logical addresses of data provided from an external host and physical addresses of memory cells included in the memory device, and wherein the physical addresses correspond to the logical addresses, respectively, the operating method comprising:
   providing host map data which includes some of the map data to the external host;
   receiving a read command and a logical address of the read command from the external host;
   checking a history of the map data transmitted to the external host;
   determining from the history that same map data is stored in both the external host and the buffer memory, wherein the same map data includes target mapping information corresponding to the logical address of the read command; and
   performing a read operation corresponding to the read command based on the target mapping information.

5. The method of claim 4, wherein the performing comprises:
   obtaining read data corresponding to the read command from the memory device; and
   providing the read data to the external host.

6. The method of claim 4, further comprising, erasing the same map data from the buffer memory.

* * * * *